Patented Feb. 27, 1951

2,543,329

UNITED STATES PATENT OFFICE 2,543,329

POLYETHYLENE STABILIZED WITH DIPHENYLAMINE

Clayton S. Myers, Westfield, N. J., assignor, by mesne assignments, to Union Carbide and Carbon Corporation, a corporation of New York No Drawing. Application March 17, 1945, Serial No. 583,390

4 Claims. (Cl. 260—45.9)

This invention relates to polyethylenes obtainable as wax-like products by polymerization under very high pressures in the presence of or absence of oxygen as a catalyst and having molecular weights ranging from about 800 to 40,000 and higher (determined by a solution-viscosity average molecular weight method described by Kemp and Peters, Industrial and Engineering Chemistry, vol. 34, No. 9; vol. 35, No. 10); they are outstanding because of their extremely low-loss characteristics when used as electrical insulation materials. They are, however, essentially thermoplastic, and those of low average molecular weight especially become soft and sticky at temperatures of 100°–105° C. when milled on the conventional two-roll mill. Moreover, they resemble natural rubber, drying oils and other organic hydrocarbons in that they deteriorate in the presence of air or oxygen, particularly when the temperature is elevated to about 100° C. and higher; this seriously impairs the efficiency of polyethylenes as low-loss electrical insulation because oxidation results in degradation and formation of impurities. Consequently the fabrication by the conventional hot-milling into sheets or by calendering on base materials or by extrusion into shapes in the temperature range required for the purposes is handicapped by these characteristics of stickiness and oxidation at elevated temperatures.

It has been found that antioxidants consisting of aromatic and aliphatic amines, and commonly used for rubber, can act as efficient stabilizers for ethylene polymers; but the amines in general have proved to be objectionable because of their dark color or their relatively poor light and thermal stability. Unstabilized polyethylene has a translucent white color that permits processing with dyes and colors to produce a wide range of colors, and colored or discoloring antioxidants greatly limit the color range.

The present invention provides for stabilization against oxidation so that the normal fabricating procedures are applicable without the foregoing objections. It rests on the unexpected properties of diphenylamine that in small percentages (fractions of one per cent) not only acts as an efficient antioxidant for polyethylenes under thermal treatment but has only slight effect on the color of the polymers and is not subject to color change on heating.

To illustrate, a polyethylene resin (molecular weight 18,000–23,000, and flow height of 55 mils by the Williams parallel plate plastometer at 130° C.) was fluxed on a two-roll mill at a roll surface temperature of 100° C. and then molded. The instability of the resin was shown by aging samples at a temperature of 100° C., employing atmospheres of air and oxygen and making power factor measurements with the following results:

| Aging Atmosphere | Average Power Factor at 50 Megacycles and 25° C. after 100° C. Aging Periods of— | | |
|---|---|---|---|
| | 0 Hours | 50 Hours | 100 Hours |
| Air | $47 \times 10^{-5}$ | $150 \times 10^{-5}$ | $290 \times 10^{-5}$ |
| Oxygen | $48 \times 10^{-5}$ | $500 \times 10^{-5}$ | $668 \times 10^{-5}$ |

The following compositions were prepared from the same polyethylene by milling on a two-roll mill at a roll surface temperature of 100° C. with representative secondary aromatic amines that are useful rubber antioxidants; the low processing temperature was made necessary by the fact that the compositions could not be removed from the roll surfaces when the surface temperature was in excess of 105° C.

| | A | B | C | D | E |
|---|---|---|---|---|---|
| Polyethylene resin | 99.8 | 99.8 | 99.8 | 99.8 | 99.8 |
| Hydroquinone | 0.2 | | | | |
| Sym. di-beta-naphthyl-paraphenylene-diamine | | 0.2 | | | |
| Aldol alpha naphthylamine | | | 0.2 | | |
| Phenyl beta naphthylamine | | | | 0.2 | |
| Thiourea | | | | | 0.2 |
| 100% by weight | | | | | |

Plaques molded from these compositions were subject to aging tests at 100° C. in an atmosphere of oxygen for different periods and measured for power factor with the results:

| Composition | Average Power Factor at 50 Megacycles and 25° C. after 100° C. Aging Periods of— | | |
|---|---|---|---|
| | 0 Hours | 50 Hours | 100 Hours |
| A | $43 \times 10^{-5}$ | $36 \times 10^{-5}$ | $36 \times 10^{-5}$ |
| B | $43 \times 10^{-5}$ | $35 \times 10^{-5}$ | $37 \times 10^{-5}$ |
| C | $45 \times 10^{-5}$ | $38 \times 10^{-5}$ | $40 \times 10^{-5}$ |
| D | $42 \times 10^{-5}$ | $37 \times 10^{-5}$ | $40 \times 10^{-5}$ |
| E | $39 \times 10^{-5}$ | $35 \times 10^{-5}$ | $44 \times 10^{-5}$ |

Degradation in power factor is a measure of the oxidation, and a comparison of the extent of degradation following from oxidation of the polyethylene alone with the results when the secondary aromatic amines were included demonstrates the effectiveness of the amines as stabilizers; in each case of stabilizer addition, however, there were the serious objections of a dark gray color being introduced by them in the initial milling and a further darkening caused by color change in the amines as a result of the thermal treatment.

The following compositions were then fluxed and milled in air for periods of 60 minutes at a surface roll temperature of 150° C.; the elevated temperature was made possible by adding a lubricant that allowed release from the rolls; but composition F without stabilizer required forcible removal from the rolls after 7 to 8 minutes of milling while compositions G and H released in the normal manner after 60 minutes of milling.

|  | F | G | H |
|---|---|---|---|
| Polyethylene resin | 99.5 | 99.3 | 99.3 |
| Propylene glycol monostearate (lubricant) | 0.5 | 0.5 | 0.5 |
| Phenyl beta naphthylamine (stabilizer) | | 0.2 | |
| Diphenylamine (stabilizer) | | | 0.2 |
|  | 100% by weight | | |

Samples were removed during the milling in air at intervals of 15 minutes and power factor determinations made on them with the results:

| Composition | Average Power Factor at 50 Megacycles (25° C.) after Milling Periods of— | | | | |
|---|---|---|---|---|---|
|  | 0 Min. | 15 Min. | 30 Min. | 45 Min. | 60 Min. |
| F | 50×10$^{-5}$ | 120×10$^{-5}$ | 190×10$^{-5}$ | 270×10$^{-5}$ | 480×10$^{-5}$ |
| G | 45×10$^{-5}$ | 47×10$^{-5}$ | 51×10$^{-5}$ | 47×10$^{-5}$ | 50×10$^{-5}$ |
| H | 50×10$^{-5}$ | 50×10$^{-5}$ | 47×10$^{-5}$ | 49×10$^{-5}$ | 49×10$^{-5}$ |

Comparing the composition containing phenyl-beta-naphthylamine (G) and that containing diphenylamine (H), the significant and markedly noticeable difference between them was the color initially and after the extended thermal treatment; composition G was colored a very dark gray initially and the color was darkened by the milling treatment, while composition H was uncolored initially and the thermal treatment caused no more than a slight tinge of a gray-yellow color.

From the foregoing results it appears that, while a number of organic substances, such as the secondary aromatic amines, can act as stabilizers against oxidation for polyethylene as shown by power factor measurements, diphenylamine is unexpectedly different from other members of that class in the absence of objectionable color and of thermal instability.

The antioxidant of this invention in addition to hot-milling operations is also useful in other methods of compounding and in applications that may involve thermal degradation or oxidation, such as calendering, extrusion, solution casting, impregnation, etc.

What is claimed is:

1. Composition of polymerized ethylene and a fraction of one per cent of diphenylamine, said composition being characterized by substantial stability as measured by power factor upon aging in an atmosphere containing oxygen and by substantial absence of color and of color change under thermal treatment.

2. Process for imparting to polymerized ethylene substantial stability as measured by power factor against degradation by oxygen which comprises hot-compounding the polymer with a fraction of one per cent of diphenylamine.

3. Process for imparting to polymerized ethylene substantial stability as measured by power factor against degradation by oxygen which comprises hot-compounding the polymer with a fraction of one per cent of diphenylamine in the presence of a lubricant.

4. Composition of polymerized ethylene having a molecular weight of at least 800 in admixture with diphenylamine in amount sufficient to stabilize the power factor of the polyethylene upon aging in an atmosphere containing oxygen.

CLAYTON S. MYERS.

REFERENCES CITED

The following references are of record in the file of this patent:

I C I: Plastics Technical Bulletin No. 5: " 'Alkathene' Brand of Polythene," page 3, Birmingham, England (November 1943).

Myers: Plastics, Sept. 1944, pages 29, 40, 42, 43 and 100.

Davis: "Chemistry and Technology of Rubber," pages 421 and 435, A. C. S. Monograph No. 74.

Hahn: Ind. Eng. Chem., 37, 526-533 (1945).

Barron: "Modern Synthetic Rubbers," page 296, Van Nostrand (1944).